(12) United States Patent
Rinberg et al.

(10) Patent No.: US 12,029,200 B2
(45) Date of Patent: Jul. 9, 2024

(54) ODOR COMPARATOR

(71) Applicant: New York University, New York, NY (US)

(72) Inventors: Dmitry Rinberg, Yonkers, NY (US); Hirofumi Nakayama, Yokohama (JP)

(73) Assignee: New York University, New York, NY (US)

( * ) Notice: Subject to any disclaimer, the term of this patent is extended or adjusted under 35 U.S.C. 154(b) by 110 days.

(21) Appl. No.: 17/906,572

(22) PCT Filed: Mar. 19, 2021

(86) PCT No.: PCT/US2021/023312
§ 371 (c)(1),
(2) Date: Sep. 16, 2022

(87) PCT Pub. No.: WO2021/188992
PCT Pub. Date: Sep. 23, 2021

(65) Prior Publication Data
US 2023/0180718 A1     Jun. 15, 2023

Related U.S. Application Data

(60) Provisional application No. 62/992,006, filed on Mar. 19, 2020.

(51) Int. Cl.
*A01K 15/02*     (2006.01)
*A01K 15/00*     (2006.01)

(52) U.S. Cl.
CPC .............. *A01K 15/02* (2013.01); *A01K 15/00* (2013.01); *A01K 2227/105* (2013.01); *A01K 2267/0356* (2013.01)

(58) Field of Classification Search
CPC .......... A61L 9/00; A61L 9/0107; A61L 9/014; A61K 38/00; A61K 38/10; A01K 1/00; A01K 1/01; A01K 1/0152; A01K 1/03; A01M 25/00
See application file for complete search history.

(56) References Cited

U.S. PATENT DOCUMENTS

| | | | |
|---|---|---|---|
| 2005/0281744 A1* | 12/2005 | Tully | A61C 9/0026 424/9.2 |
| 2010/0175629 A1* | 7/2010 | Garmon | A01K 29/00 119/419 |
| 2013/0266657 A1* | 10/2013 | Trajkovska | A01K 1/0107 424/490 |
| 2015/0038338 A1 | 2/2015 | Rinberg et al. | |
| 2016/0000859 A1 | 1/2016 | Munger | |
| 2016/0073944 A1 | 3/2016 | Lazarini et al. | |

(Continued)

OTHER PUBLICATIONS

NPL Search (Feb. 26, 2024).*

(Continued)

*Primary Examiner* — Van T Trieu
(74) *Attorney, Agent, or Firm* — Hodgson Russ LLP

(57) ABSTRACT

A method of training a rodent to identify pairs of same or different odors, whereby the rodent learns the rule irrespective of the particular odors. Once trained, the rodent can be used to measure perceptual odor similarities between members of pairs of odors, which odors may be unrelated to the odors the rodent was trained on.

21 Claims, 9 Drawing Sheets

Flow Chart 1

(56) References Cited

U.S. PATENT DOCUMENTS

2019/0261597 A1    8/2019  Tabachnik et al.
2023/0309900 A1*  10/2023  Nwulia ................ A61B 5/4011
                                                    600/303

OTHER PUBLICATIONS

Liu, D., et al., Medial prefrontal activity during delay period contributes to learning of a working memory task, Science, Oct. 24, 2014, vol. 346, No. 6208, pp. 458-463.

* cited by examiner

ODOR COMPARATOR

CROSS REFERENCE TO RELATED APPLICATIONS

This application claims priority to U.S. Provisional patent application No. 62/992,006, filed on Mar. 19, 2020, the disclosure of which is incorporated herein by reference.

STATEMENT REGARDING FEDERALLY SPONSORED RESEARCH

This invention was made with government support under contract no. U19NS112953 awarded by National Institutes of Health. The government has certain rights in the invention.

BACKGROUND OF THE DISCLOSURE

Quantification of odor perception is an unsolved problem, and a question that often comes up is do different chemicals or mixture of chemicals smell the same or different? While there are methods which allow measurement of chemical composition of odor or odor mixtures, the only method to judge their perceptual similarity is by using human testing. For example, gas chromatography (GS) may detect minor differences between two mixtures, but these differences may not affect their perceptual similarity, or GS may have a weak sensitivity to some components, which are crucial for odor perception.

There is a general interest in building generic odor generation devices for such applications as virtual or augment reality (VR or AR). However, it is difficult if not impossible at this time, to recreate complex scents by combing a few chemicals. One of the challenges is an efficient search of proper chemical combinations, which perceptually emulate complex scents, such as, for example, strawberry or chocolate. Having an efficient method for comparison of two odor sources will allow searching for such combinations and create a library of simulated scents.

SUMMARY OF THE DISCLOSURE

Animals (mammals and, specifically, rodents) have similar organization of the olfactory system and strongly overlapping repertoire of the olfactory receptors. Usually it is assumed that rodents are more capable than humans in differentiating similar chemicals or mixture of chemicals. Thus, if two odors are perceived as the same by rodents, they will most probably be perceived as the same by humans. This premise allows to use animals to measure perceptual distances between odors. This disclosure provides a method for training animals such that perceptual distances between odors can be measured.

As a working example, to measure perceptual distances across many odors, we trained mice to report if two sequentially presented odors are the same or not. It was investigated if perceptual distance between two odors is proportional to the probability of mice categorizing them as different ones. We confirmed that such behavioral readout is consistent with predictions about perceptual distances between odor mixtures and with chemical similarities between odors. Using this behavioral paradigm a matrix of perceptual distances can be constructed for many odors.

In an aspect, this disclosure provides a method of training animals to identify and report perceptually similar odors. The method comprises training an animal (such as a rodent, e.g., mouse) to learn a rule whereby the animal is trained to statistically reliably report when presented with consecutive, perceptually identical odors, irrespective of the speficity of the odors. A key feature of this disclosure is that the animals learn a rule (i.e., identify any pair of identical odors or conversely, any pair of different odors) rather than recognize specific odor pairs. The method comprises exposing animals (such as mice) to a plurality of pairs of odors (or two consecutive odors), wherein each member of a pair is the same or different, but each pair is distinct from another pair. During repeated exposure to such pairs, the animals are trained to exhibit a reportable behavior upon presentation of two identical odors (and conversely, a lack of reportable behaviour or a reportable second behaviour, upon presentation of two different odors). Such mice are deemed as trained and can be used to discriminate between same and different odors and to provide a measure of perceptual distances between odors.

DETAILED DESCRIPTION OF THE DISCLOSURE

Currently, comparison of odor sources is usually carried out by a panel of trained experts, which can be expensive and has low throughput. For example, quality control in food industry mostly relies on human testing. This disclosure provides the use of animals (such as rodents, e.g., rats or mice) and a method for training them to report perceptual similarity of two arbitrary odor sources. Mice have much larger repertoire of olfactory receptors (~1200 types in mice and ~350 types in humans) and it is assumed that if mice sense two odor sources as the same, humans will perceive them as the same. Until now, to the best of our knowledge, animals (such as mice) have not been trained to learn a behavioral paradigm whereby they can be used for comparing arbitrary odor sources.

Figure 1:
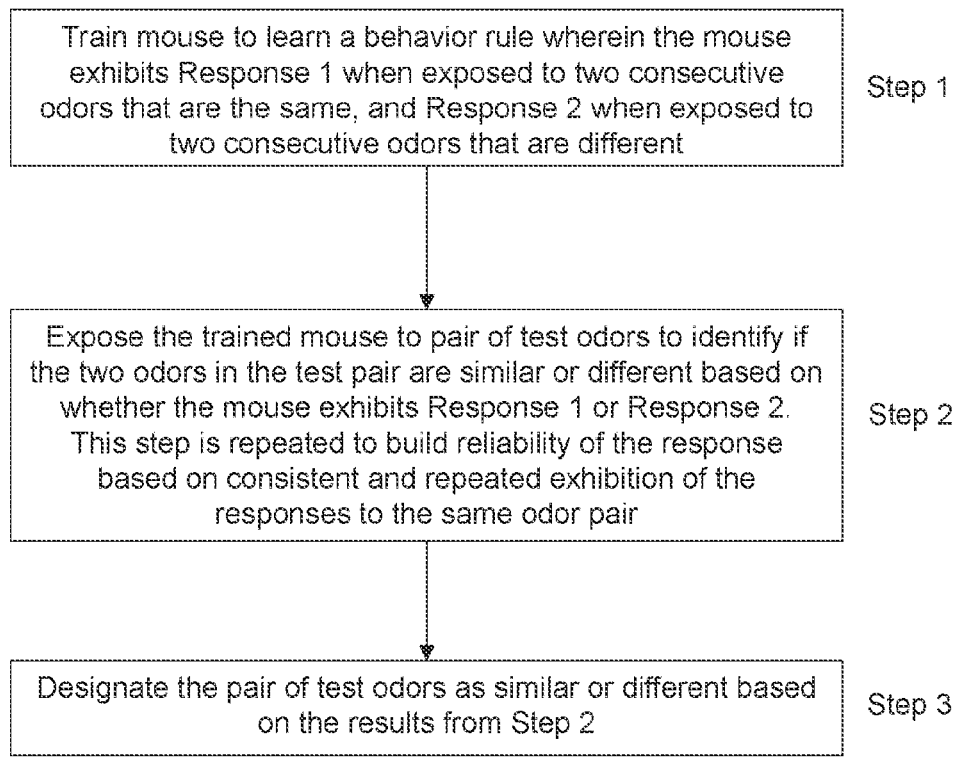
FIG. 1 is Flow Chart 1 and is a representation of a method of the present disclosure.

In an aspect, the present disclosure provides a method for measuring perceptual similarities between different odor samples. The method comprises training animals to recognize and indicate perceptual differences in odor samples. In various embodiments, the method comprises training animals (e.g., rodents, e.g., rats or mice) to learn a rule whereby the animals exhibit a taught response when two presented consecutive odors are the same, validating the reliability of the response, and then presenting a pair of test odors to the trained animals via multiple exposures to identify if the two test odors are the same or different based on strength of repeatability of the response exhibited. A key feature of this disclosure is that the once the animal is trained, it can be used to discriminate between odors unrelated to those that it was trained on thereby providing perceptual distance measurements between odors unrelated to those that it was trained on. An illustrative scheme of the present method is shown in FIG. 1 (Flow Chart 1). In Step 1, the animal (in this example, a mouse) is trained to learn a rule whereby the mouse exhibits Response 1 when exposed to consecutive odors that are the same, and Response 2 (or lack of Response 1) when exposed to consecutive odors that are different, and in Step 2, the trained mouse can then be repeatedly exposed to pairs of test odors, and depending upon whether the mouse exhibits Response 1 or Response 2 (or the percent of such responses following repeated exposures), a conclusion may be drawn with respect to the similarity or dissimilarity of the two odors and/or the perceptual distances between various odors.

The animal may be trained to exhibit any standard response as Response 1 or Response 2. For example, Response 1 may be licking of water spout, while no licking may be Response 2. As used herein, the term "report" or "reporting" or "reportable" or "indicating" with reference to an animal's response following presentation of odors to the animal means exhibition of a trained response in a reliable manner. An example of a reporting behavior is licking of a water spout. Other reporting behaviors may include (but are not limited to) licking two different lick spouts instead of licking or not licking a single spout; rotating wheels in head-fixed animals, pressing a lever or levers one or two directions; for freely moving animals, poking the nose into holes or ports; moving to specified part of a cage and the like.

An unexpected observation that formed a basis for the present disclosure was that animals (such as rodents, e.g., mice) could be taught to identify perceptual distances between odors without being previously exposed to those odors. This was achieved by training the mice to learn a rule whereby the mouse could reliably report when presented with two consecutive identical odors. Once trained, the mouse can be presented similar or dissimilar members of a pair of odors and based on a reportable response or the percent of reportable response from a trial of multiple exposures, perceptual similarity or perceptual distances between various test odors may be determined. In an embodiment, training to multiple (such as anywhere from 4 to 10, or 8-10) different odors from the beginning can be carried out.

It was surprising that while the animals in the present disclosure are trained on recognizing identical odors, once the animals learn the rule, they are able to exhibit reportable responses that enable identification of similarity of odors and perceptual distances between various test odors.

Perceptual distance is generally considered as a measure of how two objects are dissimilar, considering perceptual distance equals zero if objects are the same. In the present disclosure, we use behavioral response in animals as a measure of the perceptual distance. We measure the probability of a response of a trained animal corresponding to a correct response to presentation of different odors. For example, we measure the proportion of no-go responses. We assume that the behavioral measure of a well-trained animals to the presentation of the same odors correspond to zero perceptual distance. The higher probabilities of such a response correspond to larger perceptual distances.

With previous methods, only two odors (for example A and B) were tested and to test new odor combinations, similarity to a previously experienced odor was needed. If A-A or B-B was presented mice responded differently than for A-B or B-A presentations. However, when novel odors C, D were presented to a mouse, a mouse did not respond properly, and did not generalize the task for arbitrary odor pair. In contrast, in the present disclosure, we have developed a paradigm that allows animals to instantaneously respond to novel stimuli, and report if two new or previously experienced odor samples are the same or different. Once the animals are trained by the present method, they learn not specific odor combinations A-A, or A-B, but a general rule. Animals then generalize the rule for any new pair of stimuli. This allows using mice to compare two new odors, which can form the basis for use of the trained animals and the method as a general odor comparator.

Further, this method can provide not only information whether two odors are the same or not, but also how perceptually similar they are. The nature of animal behavior is probabilistic. Even if we present two identical odors, mice respond correctly over a multiple number of trials with some probability (typically 80-90%). In embodiments, at least 10 trials can be used. In embodiments, at least 20 trials can be used to obtain reliable information. The trials can up to or exceeding 100. In embodiments, the trials can be from 20 to 120 and any range therebetween. In embodiments, the trials can be from 10 to 150 or 20 to 150 or 20 to 100 or any number or ranges therebetween. In embodiments, the trials can be less than 10 or more than 150. If the odors are not the same, the probability of correct response depends on how similar odors are. If we present two different but similar odor stimuli, for example, two odors having similar chemical structures, or mixture of odors made of the same set of component odors with different ratios, mice have much higher chance to report that these odors are same than odor stimuli that are very different. Multiple repetition of the same odor stimuli pairs allows estimation of an average probability of mice showing the behavioral response for match trials, which is considered to be a function of odor similarity.

To train a mouse, a set-up whereby the mouse may be exposed to the odors, and wherein the mouse is able to exhibit a reportable response can be used. An example of a set-up is described further in Example 1. Within the set-up, the mouse may be exposed to a first odor for a period of time (such as 0.5 to 2 seconds, e.g., 0.5, 1, 1.5 and 2 seconds), and after an interval (such as 2-6 seconds, including 2, 3, 4, 5, 6 seconds), exposing the mouse to a second odor for a second period of time (such as 0.5 to 2 seconds, e.g., 0.5, 1, 1.5 and 2 seconds). Immediately after the second odor exposure, or within a short period, such as 1-2 seconds, if the mouse exhibits a correct response (Go for matched pair and No-Go for unmatched pair), then the mouse is given a reward. In general, a mouse is subjected to 2-3 months of training comprising 60-90 training sessions, each training session comprising 100-200 trials). Routine variations of these periods of times can be made.

Figure 2:
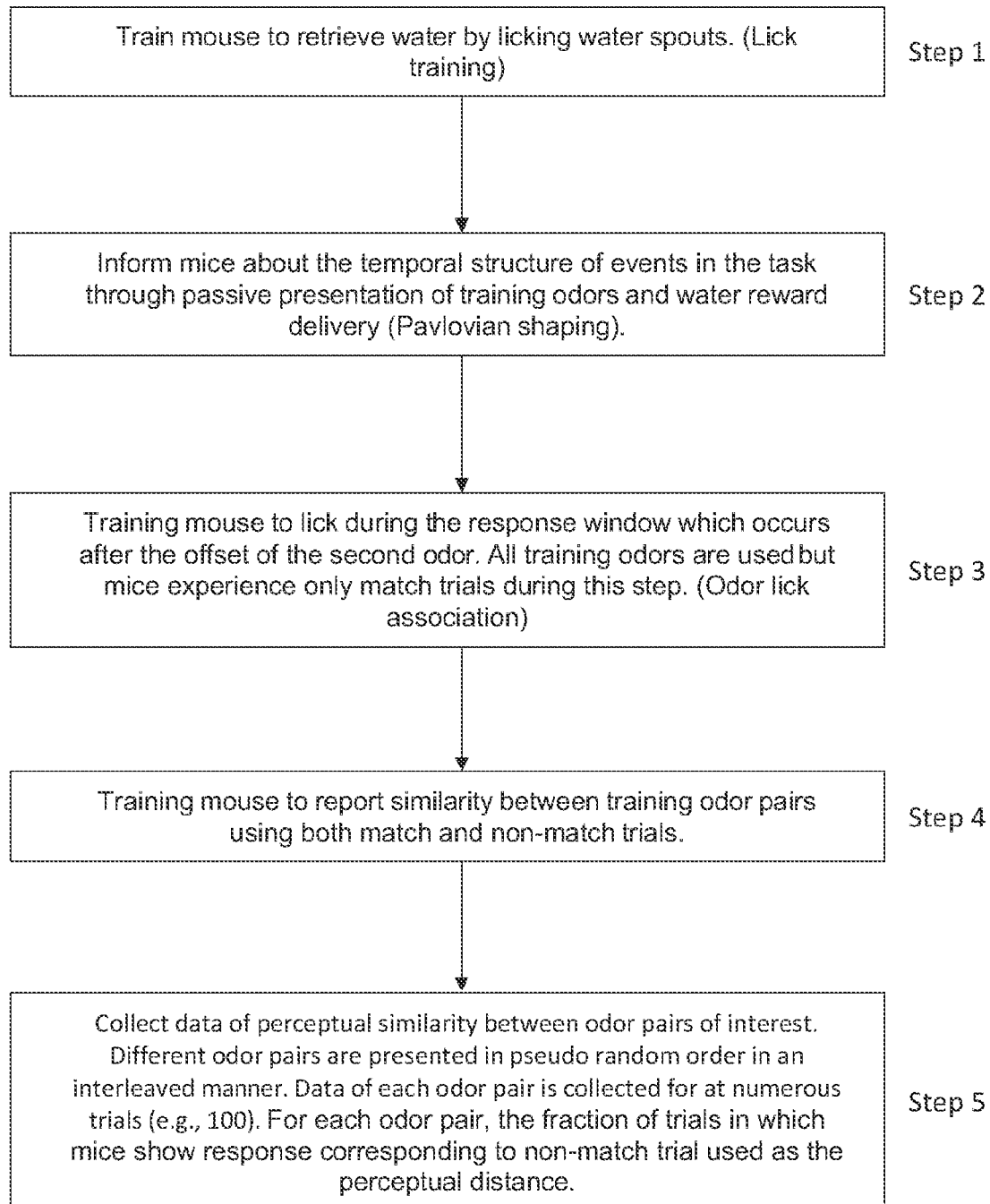
FIG. 2 is Flow Chart 2 and is a representation of an embodiment of the method of the present disclosure.

An illustrative example of the present method is shown in Flow Chart 2 (FIG. 2). For example, a mouse is first trained to receive a reward by doing a certain action. The action may be identified as a response (Step 1). In Step 2, the mouse is trained to associate presentation of pairs of odors with water reward by licking. In Step 3, the mice are presented with pairs of odors and if the second member in a pair is the same (meaning identical) as the first odor, then the mouse is trained to lick (within a certain time window). By exposing the match and non-match trials, the mouse is trained to discriminate between identical or dissimilar pairs (Step 4). Once the mouse is trained, in Step 5, the mouse can be exposed to multiple test odor pairs and for each test odor pair, the response corresponding to non-match response is noted over a plurality of exposures. Depending upon the frequency of non-match response, perceptual similarity between members of any odor pair may be assessed (Step 5). Instead of lick action, any reportable action may be used.

In an embodiment, the disclosure provides a method of training a mouse to inform perceptual odor distances comprising a) training a mouse to associate a reward (e.g., water) with a certain action (e.g., lick action), b) training a mouse to indicate if two members of a pair of odors (presenting consecutively) are same or different by rewarding the mouse for each correct response, wherein a correct response is the mouse exhibiting the action when a matched pair (identical members in the pair) is presented or not exhibiting a response when an unmatched pair (when the members in the pair are not identical) is presented. Once the mouse is trained, the mouse can be used for identifying perceptual distances between different odors by presenting the odors as pairs in a given test. The identity of the odors may be independent of the odors that the mouse was trained on.

In an embodiment, by repeated exposures to pairs of test odors, perceptual distances between the various odors in the test group can be determined. For example, if the test group has 8 odors, the mouse can be exposed to any pair from the 8 odors and based on the percent of responses (response or the absence of a response) perceptual distances between all 8 members of the group can be determined. Determination of such perceptual distances is provided in an example herein. While 8 odors is used here as an example, any number of odors may be tested, such as 10, 12, 14, 16 and the like. Perceptual distances are quantified using the fraction of Nogo responses, $P_{no-go}$ (A,B), (correct behavior in non-match trials) in trials where mice receive presentation of a pair of odors. The perceptual distance, $D(A,B)$, can be defined so that the perceptual distance between the same odors is equal to zero, and it increases with an increase of fraction of No-go responses. The perceptual distance can be expressed using the equation:

$$D(A, B) = 1 - \frac{1 - P_{No-go}(A, B)}{\sqrt{(1 - P_{No-go}(A, A))(1 - P_{No-go}(B, B))}}, \quad [\text{Eq. 1}]$$

In an embodiment, the perceptual distance between odors may be determined. Mice are trained to reliably discriminate between similar and different odors by exhibiting a certain behavior. For example, mice can be trained in go-no-go paradigm and can be exposed to two same odors (match trials) or two different odors (non-match trials). In match trials, the mouse is expected to exhibit a certain behavior (such as licking from a water spout), and in non-match trials, the mouse is expected to exhibit the different behavior (such as withholding licking from the water spout). Mice can also be trained in two alternative forced choice (2AFC) paradigm, and in match trials, for example, lick a left water spout and in non-match trials lick a right water spout. The perceptual distance between odors in a pair is proportional to exhibition of the behavior that is associated with non-match trials (e.g., in go-no-go paradigm it is lack of licking from the water spout, in 2ACF paradigm, it is licking a water spout corresponding to non-match trials). A higher number of "non-match trial" type responses corresponded to higher perceptual distance.

The term "Go" as used herein means a behavior response associated with correct behavior in match-trials (for example licks). The term "No-Go" or "Nogo" represents a behavior response associated with correct behavior in non-match trials (no licks). Go-Nogo is the term used to describe the type of discrimination task used in psychology or behavior neuroscience where experimental subjects perform binary classification task used two behavioral responses, one is to do some movement and the other is to suppress the same movement.

Alternatively, the perceptual distance can be estimated based on ratio or difference of the lick responses of different water spouts: one corresponding to correct response for match trials and another to non-match trails.

The present method was validated on known odorants. It was observed that by using the present method, pairs of odorants with similar chemical structures have smaller perceptual distances. For example, perceptual distance between two esters (propionic acid and butyric acid) was smaller than propionic acid and Pinene or propionic acid and benzaldehyde, or butyric acid and 5-methyl-2-hexanone or butyric acid and Pinene (See Example 1).

Some examples of the applications which may benefit from a method for efficient comparison of two odor sources are provided below. For example, discerning similarities or dissimilarities between odors may be used in the food or perfume industry to screen many artificially created odors in a high throughput manner. A close substitute for given smells may provide food and fragrance industries with inexpensive solutions to create products with desired smells. A library of scents may be created for general or specific use. For example, finding a mixture component, which imitate a complex odor may be used for creating virtual or augment reality (VR or AR) applications. Finding a close substitute for particular smells (perceptual equivalents), may be important for training dogs or other animals for detection of explosives or drugs, without using actual chemicals. Comparison of two odors sources may be important for quality control in chemical industry and other fields related to chemical sensing.

In an application, the present methods can be used to identifying from a plurality of samples, which sample is closes to a reference odor sample. For example, the method may comprise exposing a trained rodent (e.g., trained to reportably discriminate between identical and non-identical odors) to pairs of odors, wherein each pair consists of the reference odor and one of the test samples. The reportable action of the mouse can be recorded for each exposure trial and based on the frequency of the selected response (e.g., Go, or NoGo) response, the similarity or dissimilarity of the members of each pair can be recorded. Based on the recorded similarity or dissimilarity, the samples can be graded for their odor closeness to the reference odor. This method can be useful in identifying potential samples for their odor closeness to desirable odors such as perfumes, aromatic foods, fresheners and the like, as well as undesirable odors (such as pungent smells) or any other odorous substances. The test sample can be made up of a single component or can be a mixture of multiple components. When it is a mixture, various test samples may be mixtures of different components, or may be mixtures of the same components present in different proportions.

In an embodiment, the method may be used to titrate the components of a mixture to identify the proportion of the components that will produce perceptually similar odor to a reference odor. For example, the components of a test mixture may be A and B and these are to be tested for identifying a ratio that will generate an odor that will be perceptually similar to a reference odor R. Various test samples can be generated by mixing A and B in different ratios (increasing one and decreasing the other). Then each test sample can be paired with the reference odor R and each pair can be presented to a trained mouse multiple times as described for the method herein. Based on the frequency of correct responses, a titration curve can be generated whereby one or more ratios of A and B can be identified as being mimicking the odor of R. While this example describes a combination of only two components, A and B in a test sample, the same routine may be used if multiple components are to be tested in a sample. The trials with presentation of odor R and a mixtures can be interleaved with trials with known pairs of training odors so as to reinforce the rules.

In an aspect, this disclosure provides a rodent (e.g., a mouse) that has been trained to learn a rule whereby the animal learns to exhibit a reportable response when exposed to a pair of identical odors irrespective of the specificity of the odors. The animal may be used to determine perceptual distances between different odors based on the frequency of reportable responses when subjected to multiples exposures of test pairs of odors.

Some illustrative methods of the present disclosure are provided below.

A method of training an animal to discriminate between odors comprising a) training the animal to learn a rule whereby the animal learns to exhibit a reportable response when exposed to a pair of identical odors irrespective of the specificity of the odors; and b) exposing the trained animal multiple times to a pair of test odors and based on the probability or frequency of a desired response, compared to a reference frequency, identifying the members of the test odor pair as being similar or dissimilar.

A method for training an animal (such as a rodent, e.g., mouse) to report similarity (or dissimilarity) between multiples (such as pairs, triplicates, quadruplets etc.) of odors comprising exposing the animal to consecutive multiples of identical odors under conditions that the animal learns to associate the exposure of identical odors with a learned behavioral response.

A method for training an animal (such as a rodent, e.g., mouse) to report similarity (or dissimilarity) between multiples of odors comprising exposing the animal to consecutive plurality of identical odors under conditions that the animal learns to associate the exposure of identical odors with a learned response.

A method for training a mouse to report similarity (or dissimilarity) between pairs of odors comprising exposing the animal multiple times (such as up to or more than 100 times) to consecutive pairs of identical odors under conditions that the animal learns to exhibit a trained behavior upon subsequent exposure of identical odors. The trained behavior may be licking a water spout. The mouse may be trained on at least 2 pairs, at least 3 pairs, at least 4 pairs or at least 5 pairs of odors.

A method for determining if a pair of test odors are similar or not comprising training a mouse to exhibit a reliable reportable response to identical odor pairs, exposing multiples times the trained mouse to a pair of test odors and based on the number of times (such as percent of total) the mouse exhibits a response (or does not exhibit a response), determining that the odors are similar or different.

A method for determining if pairs of test odors are similar or not comprising training a mouse to exhibit a reliable reportable response to identical odor pairs, exposing multiples times the trained mouse to pairs of test odors and based on the number of times (such as percent of total) the mouse exhibits a response (or does not exhibit a response), determining that the pairs of odors are similar or different.

A method for determining perceptual distances between a desired number of odors within a set of test odors comprising training a mouse to exhibit a reliable reportable response to identical odor pairs, exposing multiples times the trained mouse to multiple pairs within the set of test odors and based on the number of times (such as percent of total) the mouse exhibits a response (or does not exhibit a response) for each pair of odors within the set of odors, determining perceptual distances between the various odors within the set.

The following examples are provided for illustrative purposes and not intended to be limiting.

Example 1

Method description for using mice for measuring perceptual distances between doors.

This example describes implementation of the method. A variety of different implementations is also possible.

In the current embodiment we used a behavioral paradigm delayed-match-to-sample with head-fixed mice. Alternative embodiments are presented later.

Animals. Both male and female C57BL/6 mice (Jackson laboratories) were used in the task. At the start of behavioral training, mice were at least 2-month-old and have 20 g body weight. Mice were housed under a 12 hour inverted light/dark cycle.

Animal surgeries. Prior to behavioral training, mice were implanted with a head-bar for head-fixation in the behavioral apparatus. Mice were anesthetized with isoflurane (2% for induction, 1.5% during surgery) and placed on the heated floor during the surgery. Skin overlying the skull is sterilized with betadine and incised to expose the skull. The periosteum is gently scraped away and the surface of the skull is cleaned with hydrogen peroxide. The head-bar is fixed to the skull using dental cement.

Figure 3:
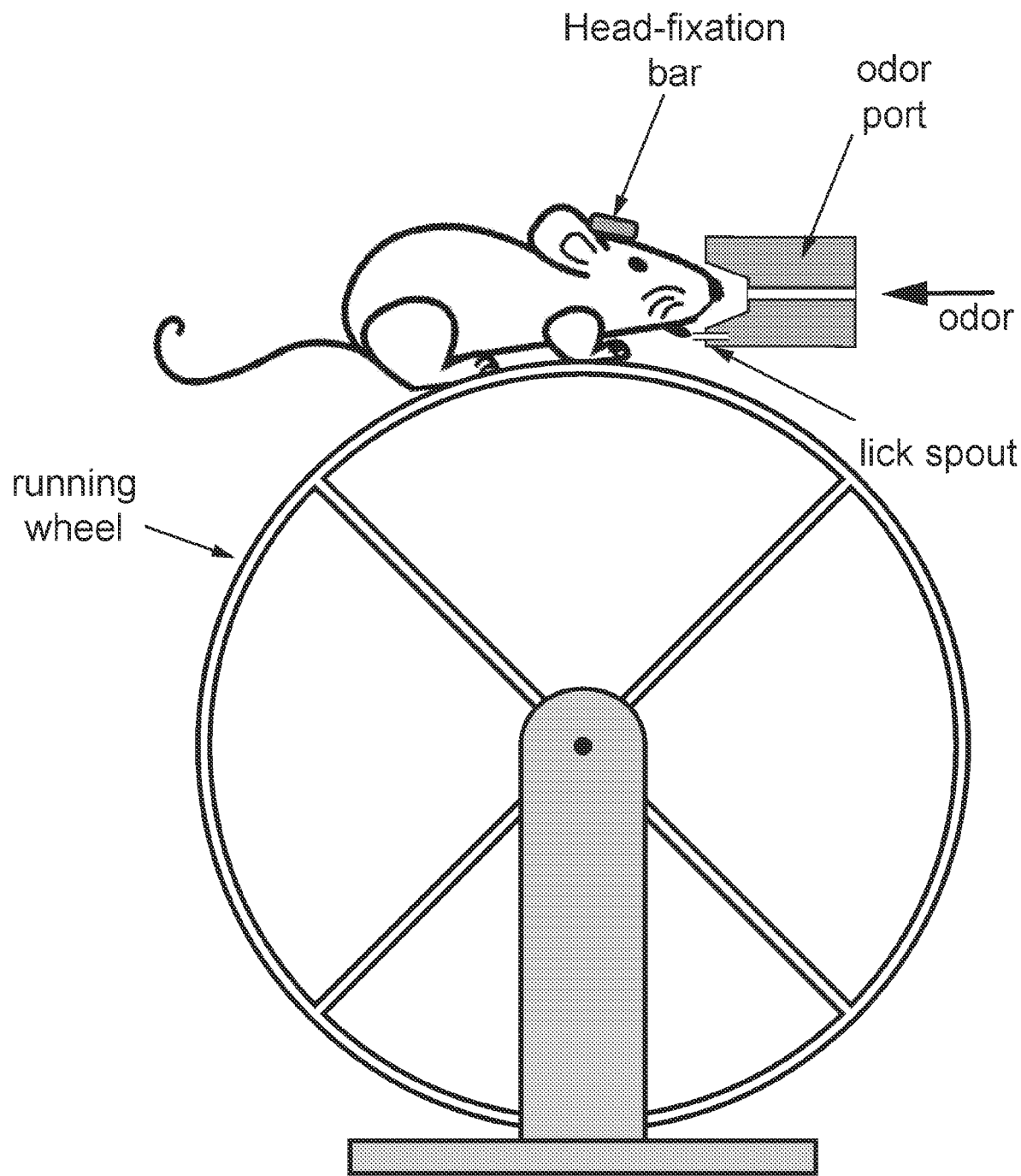
FIG. 3. Schematics of the behavioral setup: a mouse on the wheal, in the nose port. During all behavioral training, mice were head-fixed and placed on a running wheel. Odors were delivered through odor port and water reward is delivered through lick spouts.
Figure 4:
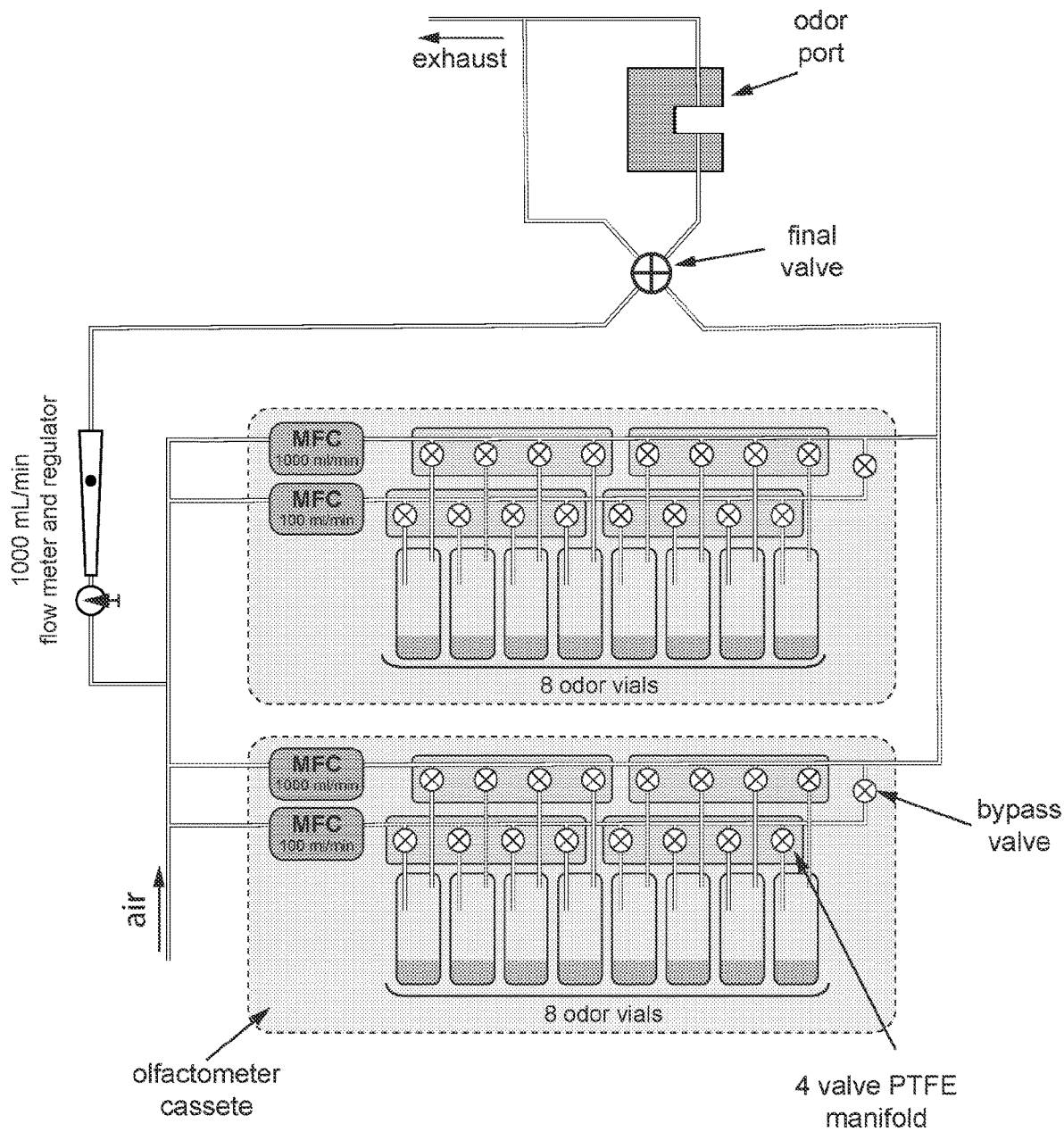
FIG. 4. Schematics of two-cassette olfactometer, a final valve, and an odor port. First, a stream of odorized air was prepared by opening a pair of odor valves in olfactometer cassettes. The concentration of odor in a stream was controlled by Mass Flow controllers (MFCs). The total flow was always kept 1 L/min, and the proportion of air going through an odor vial set up a concertation of an odor. For mixture delivery, two odor vials from different olfactometer cassettes were opened and the concentration of mixture components were controlled by correspondent MFCs. Initially a stream of odorized air was diverted to exhaust and a clean air stream was sent to an odor port. A clean air stream was controlled by a manual proportional valve and a flow meter. For odor delivery of a prepared odor or odor mixture the final valve switched air flows diverting a clean air stream to the exhaust line and an odorized air stream from the olfactometer cassettes to the odor port. The odor port had a suction or exhaust line to quickly remove all odorized air. At the end of odor presentation, both the final valve and odor vials in the olfactometer cassettes were switched off.

Behavioral setups. In the behavioral apparatus, mice were head-fixed and placed on the wheel so that mice could freely run and experienced minimal stress (FIG. 3). Odor port made of PTFE was fitted to mouse snouts and mice received odorized air there. The odor port was connected with the olfactometer, from which odorized air was delivered (FIG. 4). Odor port was also connected with vacuum line so that odorized air was quickly removed from nose ports during inter stimulus interval. Mice were trained to express their behavioral judgments by licking water spouts. Licking was detected using a capacitive touch sensor (Sparkfun, SEN-1204). Water delivery was controlled by a pinch valve (Valcor, SV74P61T).

Odor delivery. Two cassette air-dilution olfactometer was used to prepare and deliver odors with specific concentrations (FIG. 4). Each olfactometer cassette consisted of two mass flow controllers (MFC), (Alicat, MC-100SCCM-D/5M/5IN and MC-1SLPM-D/5M/5IN), four inline teflon 4-valve manifolds, (NReserach, 225T082), one on-off clean-air three port bypass valve (NResearch, TI1403270), and eight odor vials (Restek, 21797) (FIG. 4). Odors were diluted in water (total volume was less than 5 ml) and stored in amber volatile organic analysis vials (volume 45 ml). The total air flow (usually 1000 mL/min) and relative odor concentration were controlled by MFCs. A final valve (NResearch, SH360T042) was installed between olfactometer and odor port. It received two inlet flows: one form an olfactometer, another is a clean air line, and it was connected to odor port and exhaust line. The final valve diverts an odor flow before and after odor presentation time interval to the exhaust, while flushing an odor port with clean air. During an odor presentation, a clean air flow was diverted to exhaust line, and odor flow to the odor port.

Example odor-sets used for behavioral training. 8 monomolecular odors and their binary mixtures were used during training phases. An example odor set and their concentrations (volume % dilution in water) are as follows: 1) 3-Heptanone, 1%, 2) Benzaldehyde, 0.4%, 3) Methylvalerate, 0.2%, 4) Ethylbutyrate, 0.8%, 5) (+)-pinene, 1%, 6) Isovaleric acid, 0.4%, 7) 5-methyl-2-hexanone, 0.2%, 8) Cinnamoaldehyde, 0.4%. All odors are diluted in deionized water and further diluted by air or nitrogen for 10-100× in the odor delivery system.

This method doesn't rely on the choice specific odors. Mice can be trained with other sets of odors as long as they contain at least 8 different monomolecular odors from different chemical classes.

Behavioral training. To establish robust mouse behavior to measure perceptual distances between odors mice were trained to perform specific behavioral paradigm. The training procedure consisted in multiple steps outlined below: 1) initial water restriction and habituation, 2) habituation to the experimental setup, 2) lick training, 3) behavioral shaping step 1— Pavlovian shaping, 4) behavioral shaping step 2—odor-lick association, 5) behavioral shaping step 3—full task training, 6) testing of perceptual similarity between odors of interest.

Figure 5:
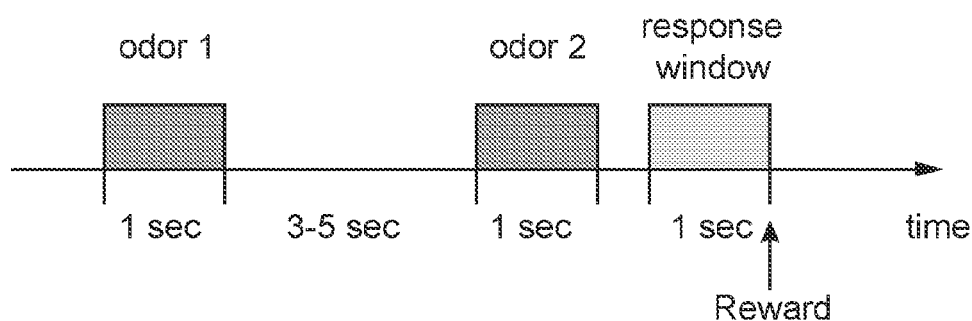
FIG. 5. Schematics of the behavioral paradigm. In each trial, mice were presented with two odor stimuli, which were separated by delay (Top). Mice were trained to report whether two odor stimuli are the same (match trials) or not (non-match trials) during the response window that occurs after the offset of the second odor presentation. Mice were trained to lick (Go) a water tube in match trials and to suppress licks (No-Go) in non-match trials.
Figure 5:
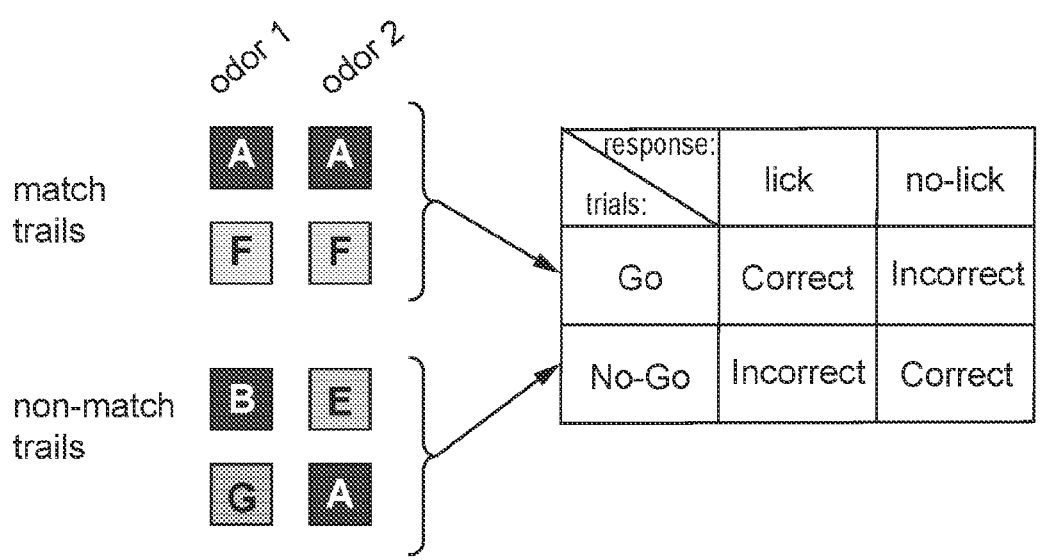

Behavioral paradigm. The behavioral paradigm aims to train mice to evaluate if two odors presented in each trial are same or not (FIG. 5). In each trial, mice were presented with two sequential odor stimuli 1 second duration and separated by a delay period for 3-5 seconds. The odor stimuli may be the same (match trails) or different (non-match trails). Mice were trained with lick-based Go-NoGo (GNG) or Two-Alternative Forced Choice (2AFC) paradigm and instructed to report their behavioral judgment during 1 second respond window, which occurs during 0.2-1.2 sec or 0.5-1.5 sec after offset of 2nd odor presentation in each trial. Odor concentration in each presentation was randomized by adjusting the flow of carrier air. In GNG paradigm, mice were trained to lick (Go) a water tube in match trials and to suppress licks (Nogo) in non-match trials. We used the percent Nogo choice (correct choice in non-match trials) for each odor pair as the measure of perceptual distance. In 2AFC paradigm, mice were trained to lick the left water tube in match trials and the right water tube in non-match trials. We used percent right choice for each odor pair as the measure of perceptual distance.

Water restriction and habituation. During the entire period of behavioral training, mice were kept under water deprivation and their correct behavioral responses were rewarded by water droplets. Water restriction began after at least one week of surgery. During the water restriction period, mice were given 1 ml water each day. During this phase, mice were habituated to the handling by experimenters. Once bodyweight of animals becomes 80% of their original body weight, mice were moved to lick training.

Habituation to the experimental setup. In this step, mice were acclimated to the experiment setup. Mice were head-fixed and placed in the experimental system (FIG. 3) for 10 minutes. During the habituation phase, mice were occasionally presented with water through a syringe or lick tube. This step required 1 day for most mice. However, if mice didn't react to free delivery of water by licking, this step was repeated in the following days.

Lick training. The purpose of this phase was to make mice learn to lick the water spout to obtain water reward. Mice were given 1-1.5 ul water drop each time they lick the water spout. In case mice didn't lick water spout at all, multiple water drops were delivered by experimenters until mice start licking water spout. Mice proceeded to the next step if they receive 100 water drops within 30 minutes. Otherwise, lick training was repeated in the following days.

Behavioral shaping step 1— Pavlovian shaping. The purpose of this step was to inform mice of the timing of behavioral events and water reward delivery. Each trial, mice were presented with the same odor twice with 3 seconds interval, which was followed by 1 sec response window (0.2-1.2 sec from the 2nd odor offset). At this step, two odors in a trial were always the same (match trials only) and 5 ul of water reward were delivered at the end of response window regardless of behavioral responses. Although licking behavior of mice had no consequence on reward delivery, licking during response window was used to evaluate if mice understood the timing of behavioral events. If mice licked during the response window at >80% of trials, mice proceeded to the next step.

Shaping step 2— Odor lick association. The purpose of this step was to make mice lick at the correct timing to receive water reward. The trial structure was same as step #1 except mice had to lick water spout during the response window (0.2-1.2 sec from the 2nd odor offset) in order to trigger water delivery. No water was delivered if mice did not lick the water spout during reward time interval. If mice received water reward at 80% or more trials, mice proceeded to the next step.

Shaping step 3— Full task training. At this step, mice were presented with both match and non-match trials. The timing of response window was set to 0.5-1.5 sec from the 2nd odor offset. Delay duration between two odor presentations was set to 3 seconds at the first session of this step. The delay duration was increased by 0.5 sec if mice achieved 70% or more correct performance in the previous behavioral sessions.

Trial types were chosen pseudo-randomly so that mice didn't receive reward from same trial types in 4 or more consecutive trials and the probability of a given trial being match and non-match trial is equal unless there is a history dependent bias in mouse behavior. We also implemented a bias correction strategy. If a choice bias could be predicted from the response history of the past three trials, the trial type of the coming trial was chosen so that biased response led to the incorrect choice. It took approximately 40 sessions to train a mouse to reach a performance criteria 70% correct responses with 5 sec stimuli interval. After reaching this criterion, mice were ready to be used to test perceptual similarity between odors of interest.

Testing of perceptual similarity between odors of interest. During this stage, the same behavioral paradigm was used: 1 sec duration of each odor presentation, 5 sec delay between odor presentations, and 1 sec response window. However, odor stimuli could be chosen from a broader odor set. The odors were defined as those for which experimenters want to measure their perceptual similarity. At this stage it is important to maintain overall animal performance above 65% for all stimulus types. In case many similar odors were tested, other odors that were chemically distinct from the target odors were included in the odor test set. To prevent mice from changing the behavioral strategies, mice were always tested with odor sets that have 8 or more distinct odors. For a reliable estimate of perceptual similarity between odor pairs, at least 100 trials were collected for each odor pair.

Data analysis for quantifying the perceptual similarity. Perceptual distance between a pair of odors is quantified based on the fraction of correct non-match responses (NoGo choice in GNG paradigm or right choice in 2AFC paradigm).

Figure 6:
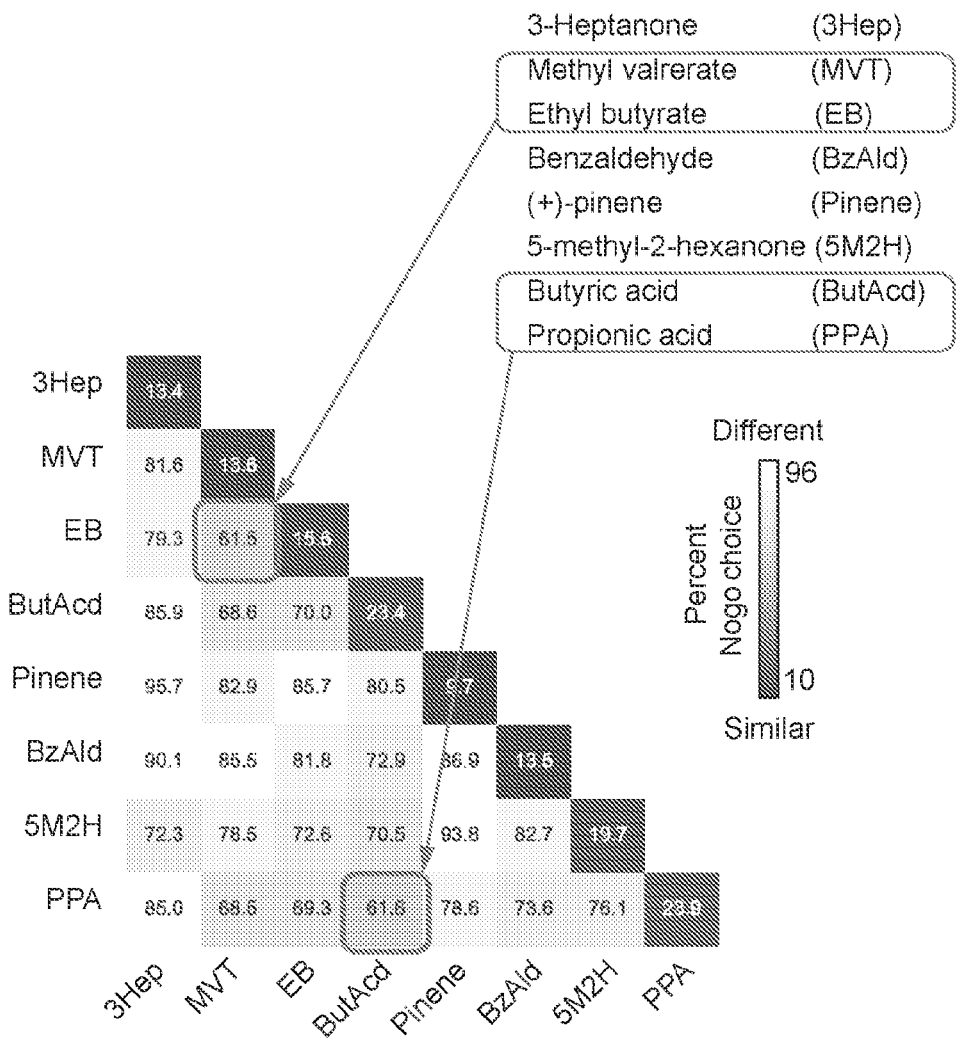
FIG. 6. Data showing example matrix of fraction of No-Go responses for pairs of odors for 8 monomolecular odorants. Each cell in the matrix represent a proportion of no-lick responses for a given odor pair. Diagonal entries in the matrix represent data from match trials, and off diagonal entries represent perceptual similarity in non-match trials. Similar odor pairs in non-match trials are shown in squares and arrows. (13726 trials from 5 mice).

Results:

To validate that this behavioral measure reflects a perceptual distance, we measured the distances between 8 odors using Go-NoGo behavioral paradigm (see session "Example odor-sets used for behavioral training") (FIG. 6). In each trial, mice received either two the same odors (match trials) or two different odors (non-match trials) with a 5 sec time interval between odor presentations. Match trials were "Go" trials and a mouse was supposed to lick a water spout, and non-match trials were "NoGo" trails, and a mouse was supposed to withhold its licking. We estimated a perceptual distance of each odor pair as a proportion of 'no-lick' responses, or percent of correct Nogo response in non-matched trials. The same odor pair was presented on 99-163 trials, and total number of trials across 5 mice was 13726. The higher number of no-lick responses in non-match trails corresponded to higher perceptual distances. Even at the match trials, mice did not lick 100% (diagonal elements on the matrix, FIG. 6). Thus, the percent 'no-lick' responses on match trials provided an average level corresponding to zero perceptual distance.

We noticed that pairs of odorants with similar chemical structures have smaller perceptual distances. Perceptual distances of two esters (Propionic acid and Butyric acid) or two acids (Ethylbutyrate and Methylvalerate) in the odor sets are smaller than those of other odor pairs.

Figure 7:
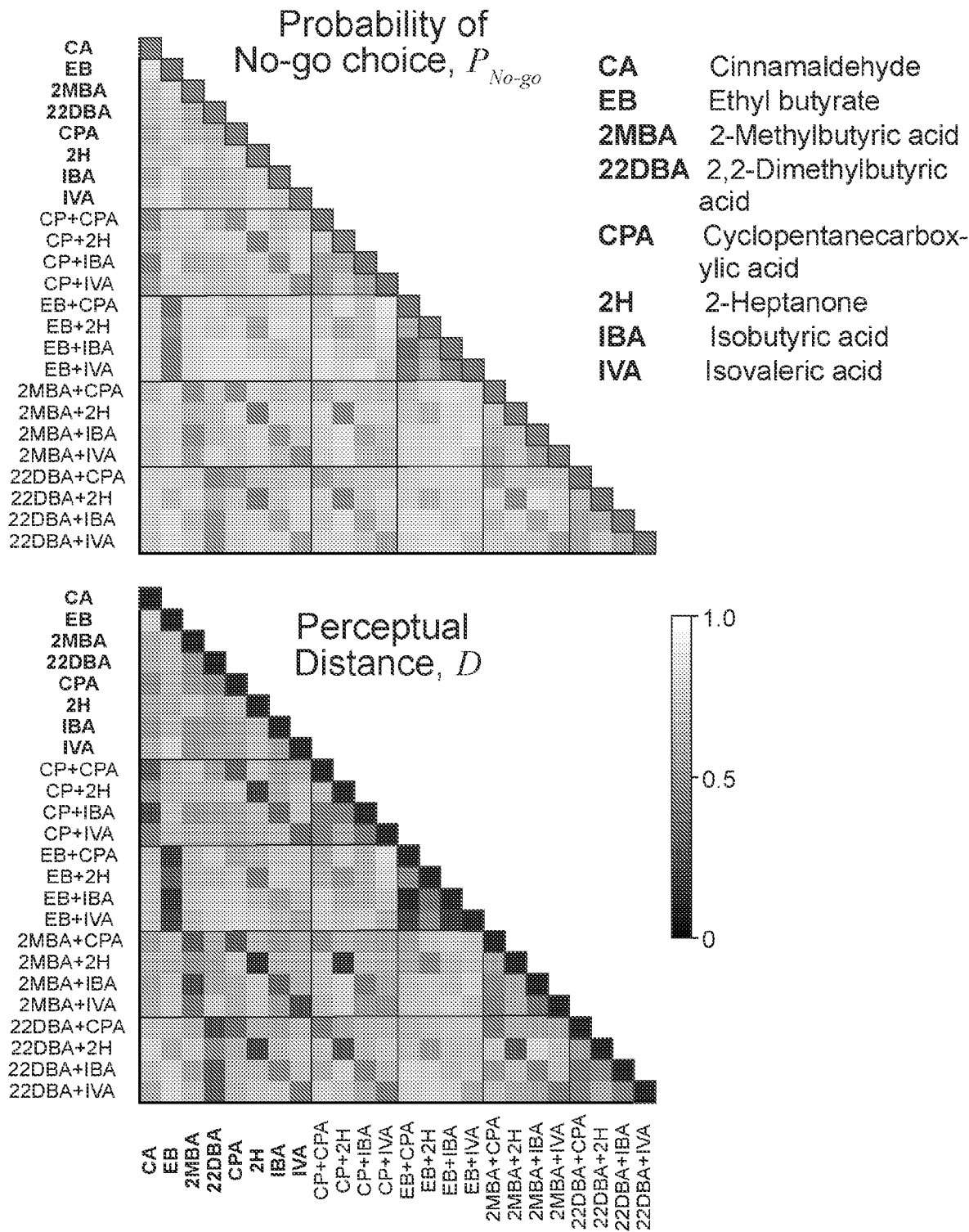
FIG. 7. Top panel. The same as FIG. 6 for 24 odors, which include 8 monomolecular odorants and 16 binary mixtures. Bottom panel. The distance matrix calculated from the probability matrix for the same data (75195 total from 10 mice).

Using a different set of 24 odors, which were made up of 8 monomolecular odors and 16 binary mixtures, we measured all pairwise distances. We measure the probability of No-go responses for each pair of odors, the non-diagonal term of the matrix, $P_{no-go}(A,B)$, and for all match trials, the diagonal terms, $P_{no-go}(A,A)$. See, shown on the top panel of FIG. 7. To estimate the perceptual distances we used Eq. 1. The Distance matrix is shown on the lower panel of FIG. 7.

Figure 8:
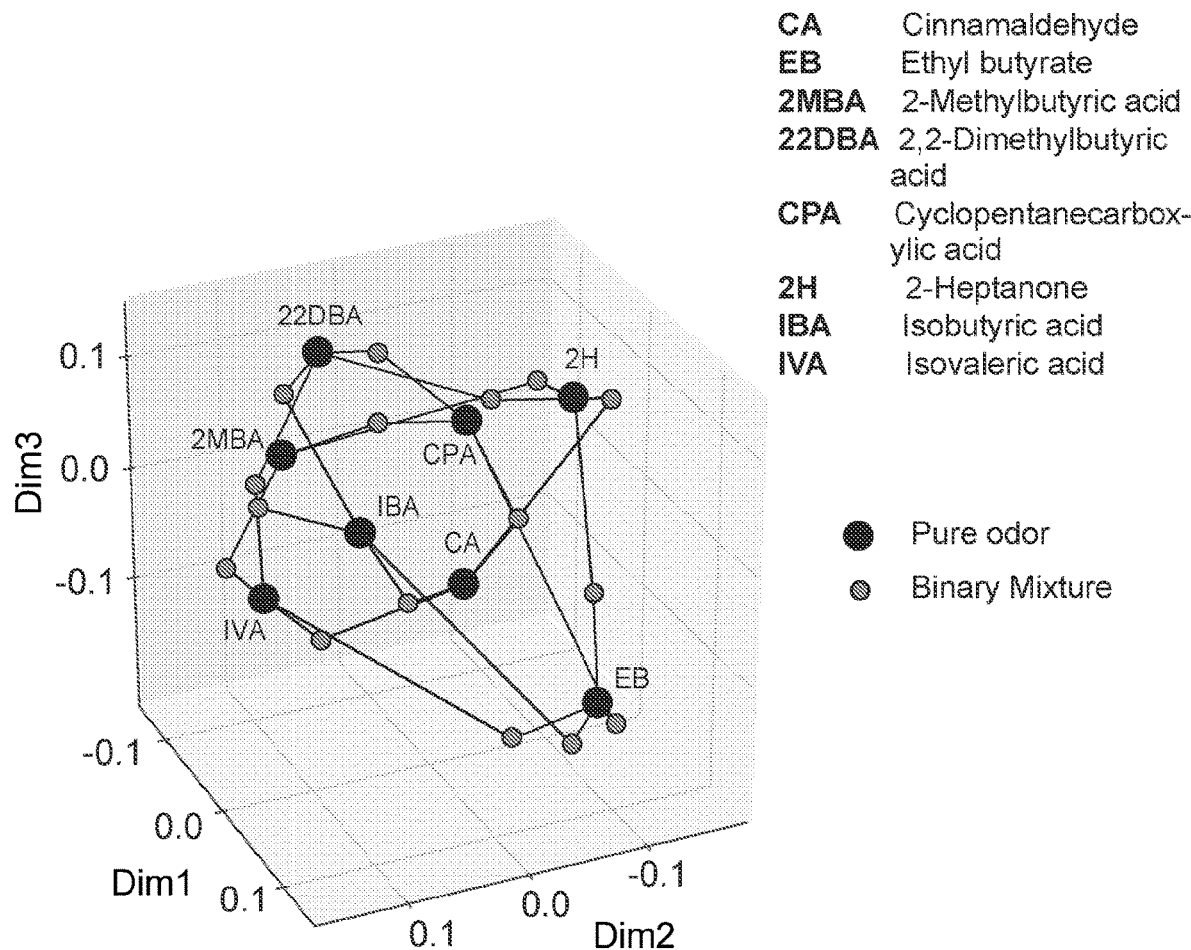
FIG. 8. Three-dimensional representation of odor distance graph for the distance matrix shown in FIG. 7.

To visualize a relative position of different odors we applied multidimensional scaling to the distance matrix and presented odor-odor distance graph in three-dimensional space (FIG. 8)

Figure 9:
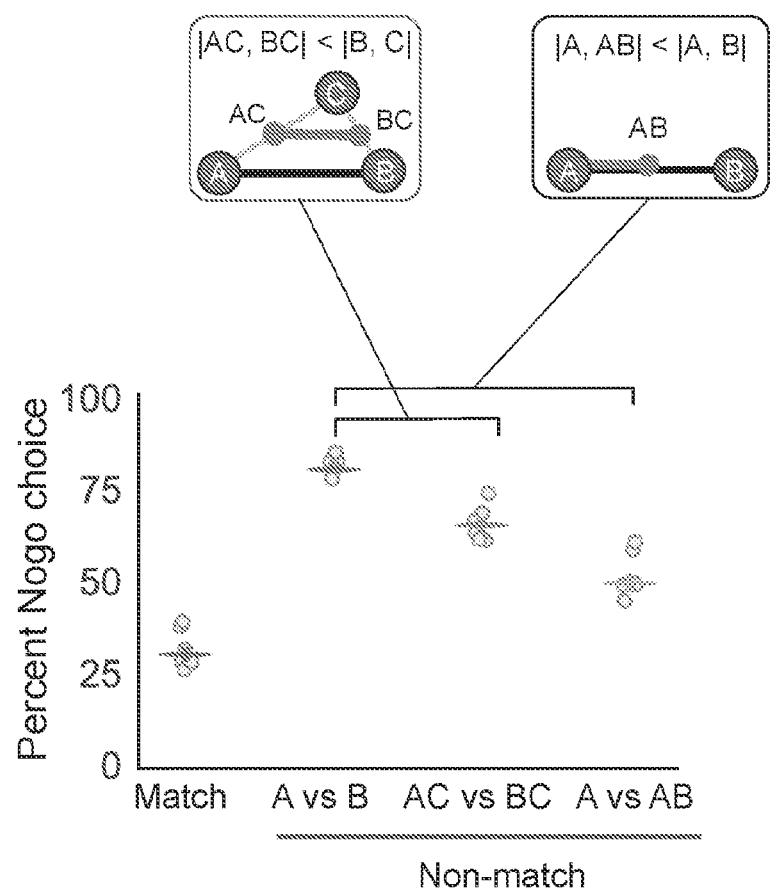
FIG. 9. Data showing self-consistency in mixture perception. Top: predictions about perceptual distances. Bottom: Behavioral readouts (percent No-Go choice) in match trials and three types of non-match trials. The horizontal bars represent average across animals, and circles represent individual animals (37105 trials from 6 mice).

Using the same odor set, we tested that a distance between pure odorant A and binary mixture AB of two odorants A and B should be smaller than the distance between the odors A and B: $|A, AB|<|A, B|$ We also tested that the distance between two odor mixtures sharing one component (AC and BC) should be smaller than the distance between pure odors A and B: $|AC, BC|<|A, B|$, which corresponds to a simple geometrical intuition presented on FIG. 9. We tested the first prediction using 25 pairs of (A, B) and the second prediction using 100 pairs of (A, B, C), and found that both predictions were correct (37105 trials from 6 mice).

These results provide a substantial evidence that the behavioral measure of the perceptual distances between pairs of odorants and their mixtures reflect the common notion of the perceptual distances for human odor perception.

Example 2

This example describes alternative embodiments. For example, the measurement perceptual distances between odors can be done using freely moving behavioral paradigm. Animals can freely move in the cage which is equipped with one or two odor ports and one or two reward ports.

With a single odor port paradigm, an animal is trained to poke the nose into the same odor port twice with some specified time interval, similar as for head-fixed paradigm. The port may or may not have a door which opens and allows animal to poke its nose into an odor port. Alternatively, external cues, like light or sound can inform the animal that it is allowed to poke its nose to the odor port.

With two odor port setup an animal needs to make sequential testing of two ports each of each is delivering a specific odor. The animal is trained to report whether two ports have the same or different odors.

Multiple ways of reading an animal response may be implemented, such as, but not limited by: an animal may poke the nose into a reward port to get water or food reward, an animal may press a lever or turn a wheel, and animal may walk to a specific area of the cage and others. Both Go-No and 2AFC and their combination may be implemented.

Animal may perform a task in an individual cage, where it is placed by an experimenter. Alternatively, multi-animal cage can be implemented, where an individual animal equipped with identifiers, like RF identifiers, need to walk to a behavioral chamber or portion of the cage where the behavioral apparatus is installed, and perform a task in order to obtain a reward.

While the present invention has been described through various embodiments, routine modifications will be apparent to those skilled in the art, which modifications are intended to be included within the scope of the present disclosure.

What is claimed is:

1. A method of training a rodent to learn a rule to inform on perceptual odor similarity between two members of a pair of odors comprising:
   a) training a rodent to perform a reportable first action; and
   b) exposing the rodent to a pair of odors, and rewarding the rodent if the rodent exhibits a correct response when exposed to a pair of odors, wherein the correct response is performance of the first action when the members of the pair are identical, or lack of performance of the first action when the members of the pair are different,
   wherein repeating step b) results in training of the rodent to learn the rule to inform on perceptual similarity between members of a pair of odors.

2. The method of claim 1, wherein the rodent is a mouse.

3. The method of claim 1, wherein the first action is licking of a water spout.

4. The method of claim 1, wherein a second action is not licking of a water spout.

5. The method of claim 1, wherein step b) is repeated at least 20 times.

6. The method of claim 1, wherein step b) is repeated about 100 times.

7. The method of claim 1, wherein the rodent is exposed to the two members of a pair of odors with an interval of from 2 to 6 seconds between the two odors.

8. The method of claim 7, wherein the rodent is exposed to the two members of the pair of odors with an interval of 3 to 5 seconds between the two odors.

9. The method of claim 7, wherein the rodent is exposed to each of the two members of a pair of odors for 0.5 to 2 seconds.

10. The method of claim 9, wherein the rodent is exposed to each of the two members of a pair of odors for 1 second.

11. The method of claim 1, wherein a response is recorded within 2 seconds of exposure to the second member of the pair of odors.

12. The method of claim 1, wherein the rodent is trained to perform a second reportable action, and instead of a correct response being lack of performance of the first action when the members of the pair are different, it is performance of a second reportable action.

13. A method of identifying perceptual odor similarity between at least a pair of odors comprising:
   a) training a rodent to learn a rule whereby the animal learns to exhibit a reportable first action when exposed to a pair of training identical odors, and a reportable second action when exposed to a pair of training dissimilar odors; and
   b) exposing the trained rodent multiple times to at least a pair of test odors, wherein the test odors are unrelated to the pair of training identical odors or training dissimilar odors, and based on the frequency of the reportable first action or the reportable second action, identifying the members of the test odor pair as being similar or dissimilar.

14. The method of claim 13, wherein the reportable first response is a lick response and the reportable second response is the absence of the lick response.

15. The method of claim 14, wherein the rodent is a mouse.

16. The method of claim 13, wherein the trained rodent is exposed to a set of odors comprising multiple pairs of test odors and based on the frequency of reportable first action or the reportable second action for each test pair, identifying perceptual odor similarities between all the members of the set with respect to each other member of the set.

17. The method of claim 16, wherein the perceptual odor similarities between all members of the set with respect to each other member of the set, are determined by a fraction of Nogo responses in trials where mice receive presentation of a pair of odors.

18. A method of identifying the degree of similarity of a plurality of test odor samples to a reference odor comprising:
   a) exposing a rodent trained to perform a first reportable action when exposed to a pair of identical odors and a second reportable action when exposed to a pair of different odors, to test pairs of odors, wherein each test pair consists of the reference odor and one of the test odor samples;
   b) based on the frequency of the first reportable actions or the second reportable actions performed by the trained rodent, identifying which pair of test odors is indicated by the trained rodent to be most similar, thereby identifying the test sample that is most similar to the reference odor.

19. The method of claim 18, wherein each test odor sample is a mixture of more than one components.

20. The method of claim 19, wherein the components are the same for all the test odor samples, but are present in different ratios compared to every other test odor sample.

21. The method of claim 20, wherein the components are not the same between the test odor samples.

* * * * *